United States Patent [19]

Tuchiya et al.

[11] Patent Number: 5,461,531
[45] Date of Patent: Oct. 24, 1995

[54] CONTROLLER APPARATUS FOR ELECTRIC VEHICLE

[75] Inventors: Eiji Tuchiya; Seiji Wataya; Masahiro Inoue, all of Hyogo, Japan

[73] Assignee: Mitsubishi Denki Kabushiki Kaisha, Tokyo, Japan

[21] Appl. No.: 245,911

[22] Filed: May 19, 1994

[30] Foreign Application Priority Data

May 19, 1993 [JP] Japan .................................. 5-117069
Dec. 20, 1993 [JP] Japan .................................. 5-319784

[51] Int. Cl.⁶ ........................................................ H02H 3/12
[52] U.S. Cl. ............................................. 361/28; 361/31
[58] Field of Search ............................ 361/24, 28, 30, 361/31, 33, 94, 18

[56] References Cited

U.S. PATENT DOCUMENTS 3,912,978  10/1975  Poole ......................................... 361/58
4,680,512  7/1987  Melocik ..................................... 361/29
5,293,076  3/1994  Fukui ......................................... 361/92
5,306,900  4/1994  Hofsass et al. ........................... 361/33

Primary Examiner—Todd DeBoer
Attorney, Agent, or Firm—Sughrue, Mion, Zinn, Macpeak & Seas; Richard C. Turner

[57] ABSTRACT

A controller apparatus for an electric vehicle includes a power supply, a power converting section for converting power supplied from the power supply, a motor which receives an output from the power converting section to drive the electric vehicle; an accelerator opening detector for detecting an accelerator opening; a controller section for controlling said power converting section in response to a detected output from said accelerator opening detector; a current detector for detecting the current supplied to the motor from the power supply; and failure decider for deciding that the controller suffers a failure when the output from the current detector is not smaller than the reference value previously determined in accordance with the accelerator opening, thereby stopping the drive of the motor. In such a structure, the torque not smaller than that required by a driver is produced so that it is possible to prevent the electric vehicle from running away.

10 Claims, 9 Drawing Sheets

CONTROLLER APPARATUS FOR ELECTRIC VEHICLE

BACKGROUND OF THE INVENTION

The present invention relates to a controller apparatus for driving an electric vehicle, and more particularly to a controller apparatus capable of preventing the vehicle from running way due to trouble of the controller.

The controller apparatus for an electric vehicle as shown in FIG. 13 has been proposed.

In FIG. 13, reference numeral 1 define a battery as a power supply, which is charged by a power generator (not shown) and supplying DC power to electric load; 2, an invertor main circuit which is a power converter section for converting the DC power supplied from the battery 1 into AC power; 3, an induction motor for driving an electric vehicle in response to the output from the invertor main circuit 2; 4, a contactor which is a switch arranged on a power supply path from the battery 1 to the invertor main circuit 2; 5, a pulse generator for detecting the rotary speed of the induction motor 3; 6, an AC current sensor for detecting the current flowing through the induction motor 3; and 7, an accelerator opening sensor for detecting the opening of an accelerator (not shown), which may be e.g. a potentiometer generating the voltage corresponding to an accelerator opening. The accelerator opening, which corresponds to the pressing amount of an acceleration pedal (not shown) being pressed by a driver, indicates the torque required by the driver. The controller apparatus further includes an opening/torque conversion memory 8 for generating the signal (hereinafter referred to as a torque command value) corresponding to a desired torque on the basis of the detected output from the accelerator opening sensor 7.

The opening/torque conversion memory 8 has an output characteristic as shown in FIG. 11. It outputs the torque command which causes the induction motor 3 to provide the torque of 15.8 Kgf·m when the output from the accelerator opening sensor 7 is 3.86 V assuming that the rotary speed of the induction motor 3 is 2100 rpm. Incidentally, in FIG. 11, the accelerator opening being of zero corresponds to when regenerative braking is carried out (electric braking state) or the vehicle is at rest. At the time of regenerative braking, the opening/torque conversion memory 8 outputs the torque command value of 0 to −15.8 Kgf·m corresponding to the rotary speed of the induction motor 3. Furthermore, in FIG. 13, reference numeral 9 defines a function generator for controlling the invertor main circuit 2 by vector-operating the value and frequency of a voltage applied to the induction motor 3 on the basis of the output signals from the pulse generator 5 and the AC current sensor 6 and various input signals (not shown). The function generator 9 and the opening/torque conversion memory 8 constitute a control section and can be organized by a microcomputer.

The thus configured controller apparatus for an electric vehicle controls transistors 2a to 2f in the invertor main circuit 2 on the basis of the torque command value and output from the function generator 9 to drive the induction motor 3, thereby providing a driving force characteristic as shown in FIG. 10. FIG. 10 shows the driving force characteristic required by general electric vehicles. The transistors 2a to 2f serve to change the value and frequency of the voltage applied to the induction motor 3 by PWM (pulse width modulation). The technique for controlling the above induction motor is well known so that its operation is not explained in detail here.

The above conventional controller apparatus for an electric vehicle has the following defects. For example, when the opening/torque conversion memory 8 or the function generator suffers any failure, i.e. in the event of failure of the microcomputer and several kinds of components such as an A/D converter, the torque command value larger than the opening of an accelerator, i.e. the torque required by a driver may be output so that excess power may be supplied to the induction motor 2. As a result, the electric vehicle may runaway.

SUMMARY OF THE INVENTION

The first object of the present invention is to provide a more reliable controller apparatus for an electric vehicle which can prevent the electric vehicle from running away due to the output torque larger than that required by a driver.

The second object of the present invention is to provide a more reliable controller apparatus for an electric vehicle which does not erroneously decide that the controller is faulty or suffers a failure even though it is actually normal when a motor is in an electric braking state.

The third object of the present invention is to provide a safer controller apparatus for an electric vehicle which provisionally stops the drive of a motor when failure of the controller is detected and thereafter surely stops the drive of the motor by opening a switch.

The fourth object of the present invention is to provide a more reliable controller apparatus for an electric vehicle which does not erroneously decide that the controller is faulty owing to noise.

The fifth object of the present invention is to provide a controller apparatus for an electric vehicle which can detect failure of the controller at any accelerator opening.

The sixth object of the present invention is to provide a safer controller apparatus for an electric vehicle which can detect failure of the controller at any accelerator opening, and can prevent the vehicle at rest from abruptly running even when an accelerator opening sensor is faulty.

The seventh object of the present invention is to provide a more reliable controller apparatus for an electric vehicle which does not erroneously decide that the controller is faulty owing to noise and also can surely stop the drive of a motor when the failure is detected.

The eighth object of the present invention is to provide a controller apparatus for an electric vehicle which is provided with more reliable failure deciding means which is simple in structure.

The ninth object of the present invention is to provide a more reliable controller apparatus for an electric vehicle which is provided with more reliable failure deciding means which is simple in structure, does not erroneously decide that the controller is faulty owing to noise and also can surely stop the drive of a motor when the failure is detected.

In order to attain the above objects, the controller apparatus for an electric vehicle, includes current detector for detecting the current supplied to a motor from a power supply and decision unit for deciding that the controller is faulty when the output from the current detector is larger than the reference value previously determined in accordance with an accelerator opening, thereby stopping the drive of the motor.

In operation, the controller apparatus decides that the controller is faulty when the output from the current detector is larger than the reference value previously determined in accordance with an accelerator opening, thereby stopping the drive of the motor.

According to the invention, the controller apparatus further includes failure decision unit for inhibiting failure decision when the motor is in an electrical braking state. According to the invention, the controller apparatus inhibits the failure decision when the motor is in an electrical braking state.

The controller apparatus further includes switching unit arranged on a power supply path to a power converting section, a failure detector for detecting that the controller is faulty when the output from the current detector is larger than the reference value previously determined in accordance with an accelerator opening and first delay unit for delaying the output from the failure detector. According to the invention, the controller apparatus stops the drive of the motor on the basis of the output from the failure detector and also opens the switching unit on the basis of the signal obtained by delaying the output from the failure detector.

The controller apparatus includes a failure detector for detecting that the controller is faulty when the output from the current detector is larger than the reference value previously determined in accordance with an accelerator opening and second delay unit for delaying the output from the failure detector. According to the invention, the controller apparatus delays the output from the failure detector and stops the motor on the basis of the delayed signal.

The controller apparatus further includes reference value computing unit for computing a reference value previously determined in accordance with an accelerator opening and failure detector for detecting failure of the controller on the basis of the outputs from the current detector and reference value computing unit. According to the invention, the controller apparatus computes a reference value corresponding to an accelerator opening, and decides that the controller is faulty when the output from the current detector is larger than the reference value to stop the drive of the motor.

The controller apparatus further includes accelerator closed-state detector for detecting that an accelerator is in a closed state and reference value computing unit for outputting a first predetermined value when the accelerator closed-state detector detects the closed state of the accelerator. According to the invention, the controller apparatus adopts a first predetermined value as a reference value when the closing state of an accelerator is detected and decides that the controller is faulty when the output from the current detector is larger than the reference value.

The controller apparatus includes switching unit arranged on a power supply path to a power conversion section, second delay unit for delaying the output from the failure detector unit and third delay unit for delaying the output from the second delay unit. According to the invention, the controller apparatus detects failure of the controller when the accelerator is in a closed state and the output from the current detector is larger than a first predetermined value and stops the drive of the motor on the basis of the signal obtained by delaying the output from the failure detector by the second delay unit and also opens the switching unit on the basis of the signal obtained by delaying the output from the second delay unit by the third delay unit.

The controller apparatus includes accelerator closed-state detector for detecting the closed state of an accelerator and failure detector for comparing the output from current detector with a predetermined reference value and detecting failure on the basis of the comparison result and the output from the accelerator closing-state detector. According to the invention, the controller apparatus decides that the controller is faulty when the accelerator is in a closed state and the output from the current detector is larger than the second predetermined value, thereby stopping the drive of the motor.

The above and other objects and features of the present invention will be more apparent from the following description taken in conjunction with the accompanying drawings.

DESCRIPTION OF THE PREFERRED EMBODIMENTS

Embodiment 1

Figure 1:
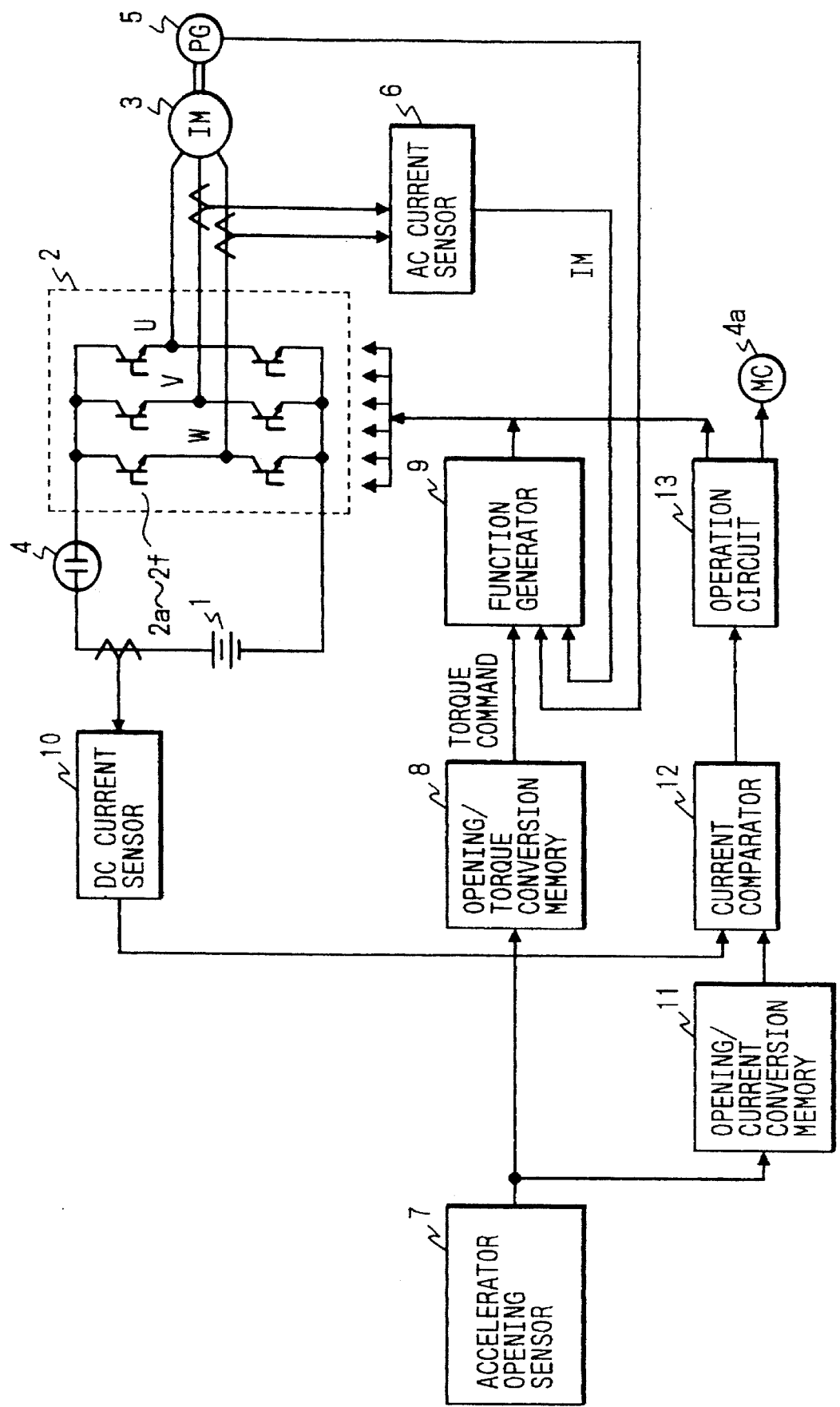
FIG. 1 is a block diagram of the controller apparatus for an electric vehicle according to the first embodiment of the present invention.

Now referring to the drawings, an explanation will be given of the controller apparatus for an electric vehicle according to the first embodiment according to the present invention.

FIG. 1 shows the configuration of the controller apparatus in block form. In FIG. 1, like reference numerals refer to like or corresponding parts in FIG. 13. The basic operation of each section is the same as in FIG. 13.

Figure 9:
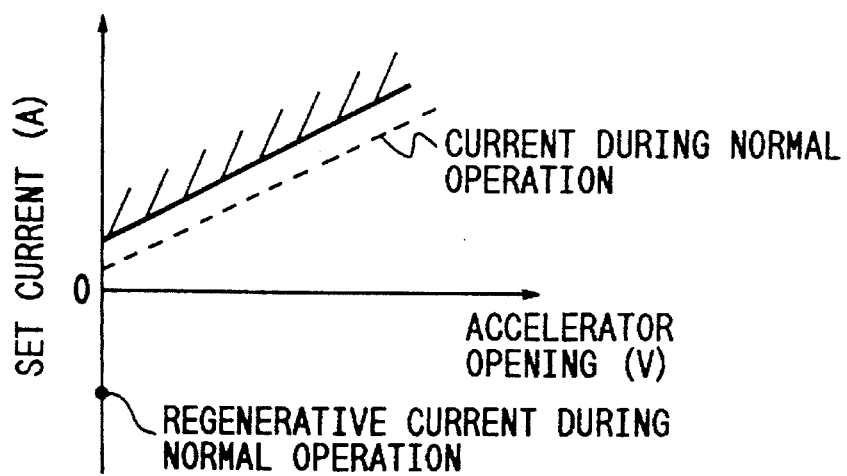
FIG. 9 is a characteristic graph showing the set current corresponding to the accelerator opening in the memory circuit according to the present invention.
Figure 10:
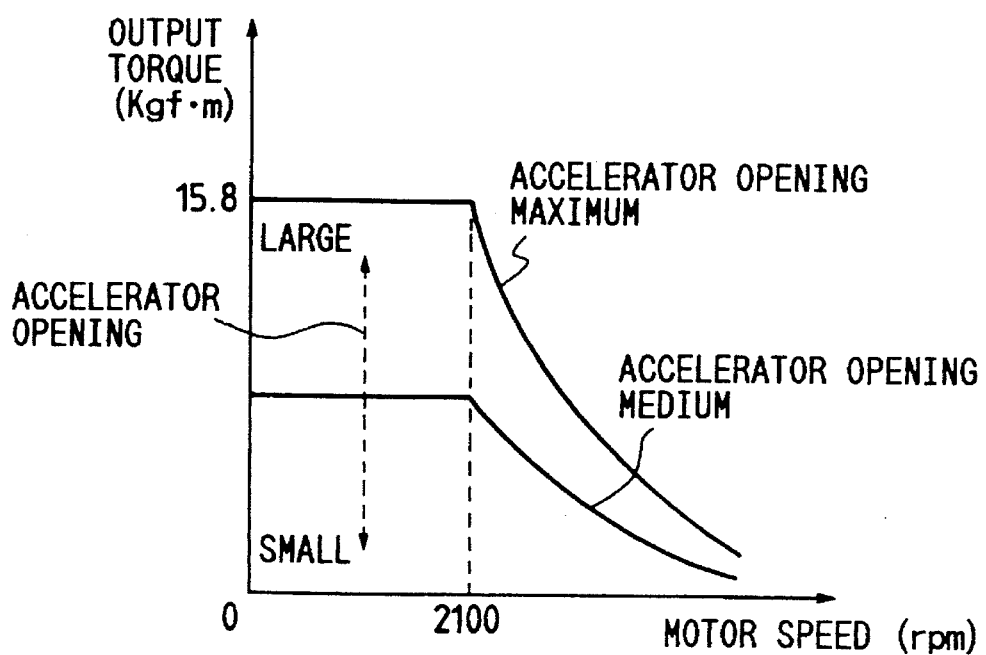
FIG. 10 is a characteristic graph showing the output of a motor corresponding to the rotary speed of the motor in a general electric vehicle.
Figure 11:
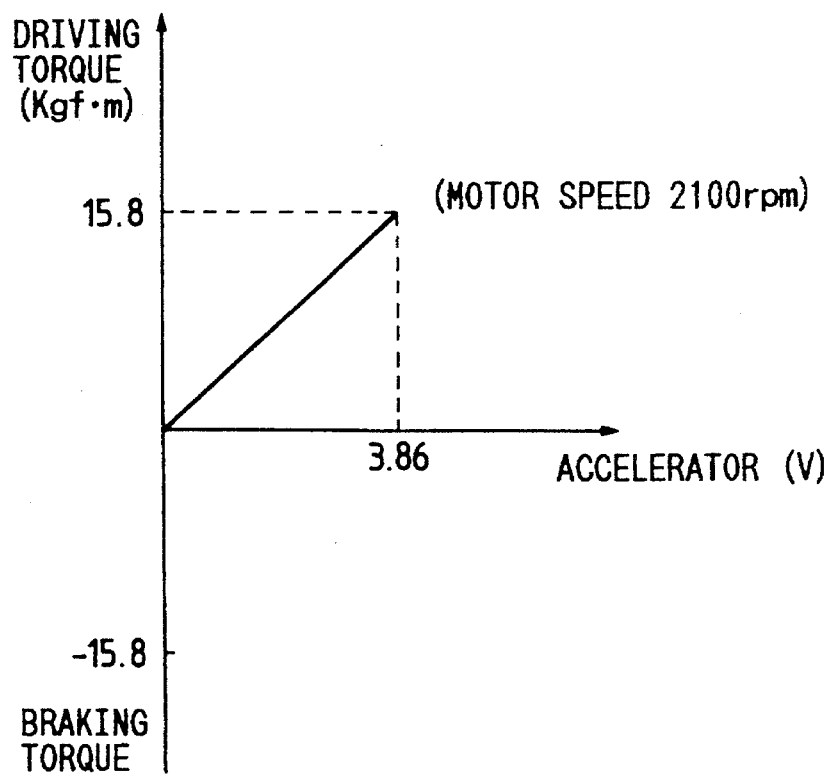
FIG. 11 is a characteristic graph showing the output corresponding to the accelerator opening in a general electric vehicle.
Figure 13:
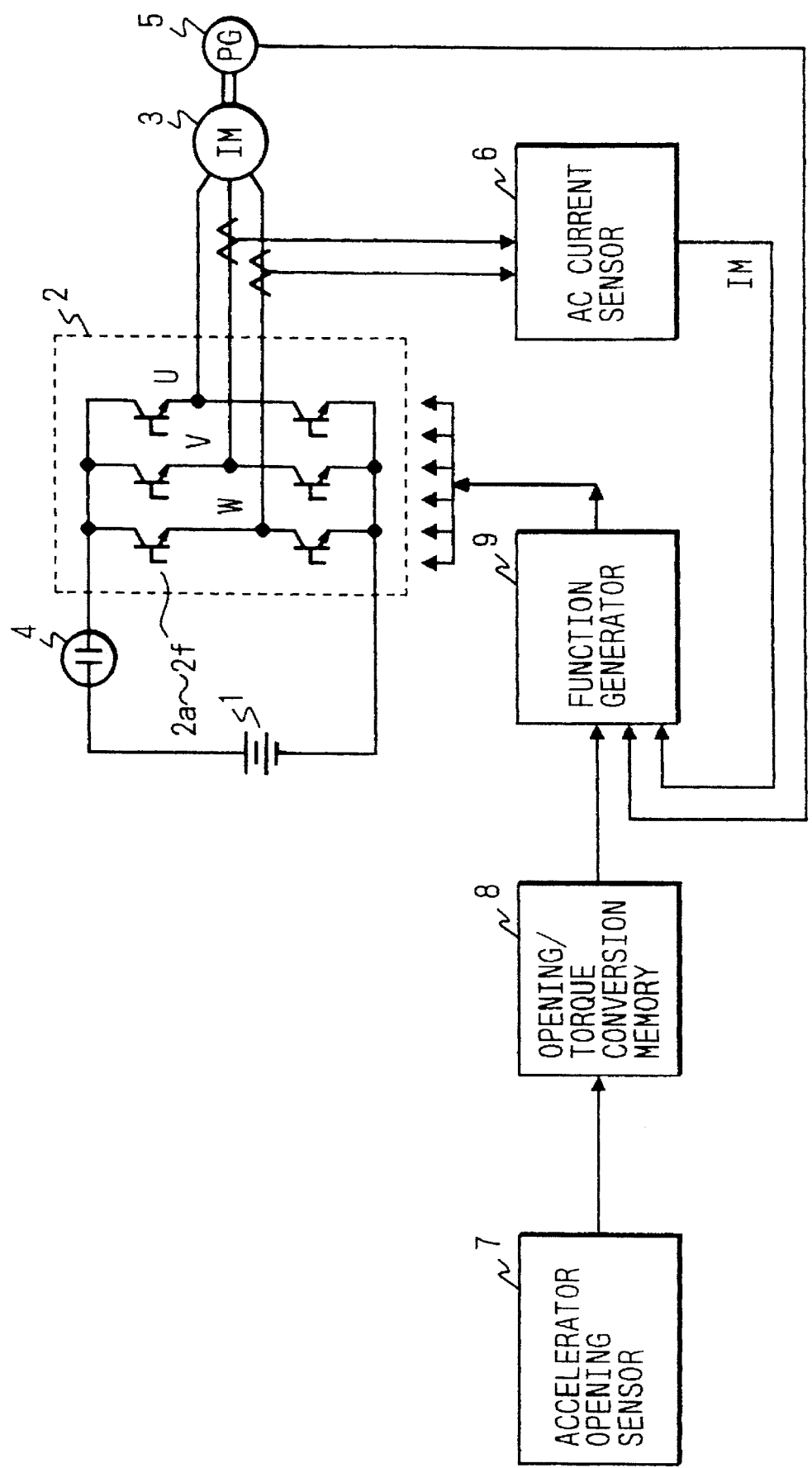
FIG. 13 is a block diagram showing the prior art controller apparatus for an electric vehicle.

As seen from FIG. 1, in addition to the components shown in FIG. 13, it is provided a DC current sensor 10, which serves as a current detecting means, arranged on the power supply path to the invertor main circuit 2 and an opening/current conversion memory 11, which serves as a reference value computing means, for computing a reference value predetermined in accordance with an accelerator opening. The memory 11 reads a stored set current value which is predetermined in accordance with the accelerator opening in response to the output from the accelerator opening sensor 7, and outputs it. The set current stored in the memory 11 is a lower limit of the hatched portion in FIG. 9. The lower limit is slightly larger (e.g. by ten percent) than the maximum value of the output current from the invertor main circuit 2 when normal control is being carried out with respect to the accelerator opening indicated by a broken line. The controller apparatus further includes a current comparator 12 for comparing the respective outputs from the DC current sensor 10 and the opening/current conversion memory 11. The current comparator 12 serves as a failure detecting means which detects failure of the controller when the output from the DC current sensor 10 is larger than that from the opening/current conversion memory 11 to provide a "1" level signal, i.e. failure detection signal. The controller apparatus further includes an operation or computation circuit 13 for stopping the drive of the induction motor 3 in response to the failure detection signal from the current comparator 12. The output from the operation circuit 13 is fed to the function generator 9 or the invertor main circuit 2 thereby to stop the power supply to the induction motor 3. The output from the operation circuit 13 is also fed to the base of a transistor (not shown) or relay (not shown) for driving the exciting coil 4a of the contact making 4.

It should be noted that the opening/current converter memory 11, current comparator 12 and operation circuit 13 form the failure decision means. And the opening/current converter memory 11, current comparator 12 and operation circuit 13 are constructed by only hardware separately from a microcomputer (control portion) constituting the opening/torque converter memory 8 and function generator 9.

The operation of this embodiment will be explained below. An explanation will be given of the state where a driver presses an accelerator pedal (not shown) so that an electric vehicle is running. The DC current sensor 10 usually senses the current supplied from the battery 1 to the induction motor 3 through the invertor main circuit 2 or the current from the induction motor 3 returned to the battery 1 through the invertor main circuit 2 to provide a positive signal (during motor driving) or negative signal (during motor regeneration) to the current comparator 12. On the other hand, the accelerator opening sensor 7 senses the pressing amount of the accelerator pedal, namely, the opening of the accelerator. The opening/current converter memory 11 reads a preset current corresponding to the output from the accelerator opening sensor 7 from the memory circuit. The current comparator 12 selects only positive signals from outputs from the DC current sensor 10 and compares them with the preset current. When the selected signal is larger than the preset current, the comparator 12 detects failure of the control apparatus and produces a "1" level signal. Specifically, since the preset current is slightly larger than the maximum value of the output current from the invertor main circuit 2 when normal control is being carried out for the present accelerator opening, if the current supplied to the induction motor 3 is larger than the preset current, it can be decided that the controller is faulty. Further, the induction motor 3 is subjected to regenerative braking, i.e. in an electrical braking state although the controller is normal, as the case may be, the output from the DC current sensor 10 is negative and larger than the preset current. The reason why only the positive signals are selected from the outputs of the DC current sensor 10 is to prevent such a state from being erroneously detected as failure. The output from the DC current sensor 10 can be selected by the structure in which the current comparator 12 has at its input a diode the anode of which is connected to the signal output line of the DC current sensor 10 and the cathode of which is connected to ground. In this case, it should be noted that the diode serves as a failure decision inhibiting means.

In response to the failure detection signal from the current comparator 12, the operation circuit 13 stops the operation of the invertor main circuit 2 thereby to stop the drive of the induction motor 3. There are several methods of stopping the invertor in response to the failure detection signal. For example, the operation of the invertor can be stopped in such a manner that the failure detection signal is provided to the function generator 9 or invertor main circuit 2 to invalidate the signal from the function generator 9 (e.g. make the signal "0") or make all the base signals of the transistors 2a to 2f "0".

In this way, failure can be detected at any accelerator opening. When the failure is detected, no current is supplied to the induction motor 3 so that it is possible to prevent the vehicle from running away. Further, when the induction motor 3 is in the electrical braking state, the failure decision is inhibited, therefore, the failure will not be erroneously detected.

By detecting the failure to stop the operation of the invertor main circuit 2 and the drive of the induction motor 3, the intended object can be attained. However, in order to assure safety, it is desirable to place the exciting coil 4a of the contactor 4, which is always excited during the normal operation, in a non-exciting state and open the contactor 4 to separate the battery 1 from the induction motor 3. In order to avoid generation of arc, the contactor 4 is preferably stopped after the invertor main circuit 2 stops.

Figure 2:
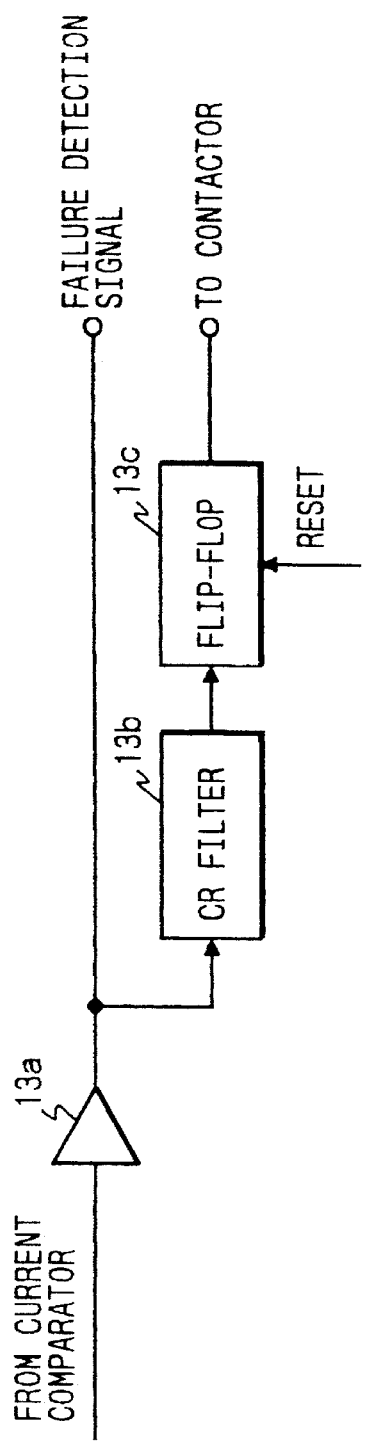
FIG. 2 is a block diagram showing an example of the main part of the computing circuit 13 in FIG. 1.

FIG. 2 is a circuit diagram showing the main part of the operation circuit 13. In FIG. 2, reference numeral 13a denotes a buffer for receiving the output from the current comparator 12; 13b denotes a CR filter which is the first delay means starting an integration operation in response to the "1" level signal from the buffer 13a. The delay time by the CR filter 13b is set for a time longer than the time from when the current comparator 12 detect failure to when the invertor main circuit 2 is stopped. Reference numeral 13c denotes a flip-flop which stores the failure detection signal and turns off the transistor (not shown) which drives the exciting coil 4a.

The operation of the operation circuit will be explained below. In response to the failure detection signal from the current comparator 12, the buffer 13a produces a "1" level signal. The operation circuit 13 immediately stops the invertor main circuit 2 on the basis of the "1" level signal from the buffer 13a. The "1" level signal from the buffer 13a is also fed to the CR filter 13b. In response to this "1" level signal, the CR filter 13b starts an integration operation. The output from the CR filter 13b gradually becomes large from zero to reach the value (threshold level) which the flip-flop 13c recognize as a "1" level. Now it is assumed that the time from when the CR filter 13b starts the integration operation in response to the "1" level signal to when the output from the CR filter 13b reaches the threshold level of the flip-flop 13c is longer than the time from when buffer 13a produces the "1" level signal to when the invertor main circuit 2 is stopped. The flip-flop 13c recognizes and stores the output from the CR filter 13b as the "1" level signal after the invertor main circuit 2 stops, and also produces the "1" level signal. This "1" level signal turns off the transistor (not shown) which drives the exciting coil 4a, thereby opening the contact making 4.

In accordance with the above structure, the battery 1 and induction motor 3 can be separated from each other after the invertor main circuit 2 stops, thus surely stopping power supply to the induction motor 3. Storing also the failure detection signal from the buffer 13a in a flip-flop permits the drive of the induction motor 3 to be more surely stopped.

Resetting the above flip-flop and the flip-flop 13c can be carried out by the turn-off or turn-on operation of a key switch. The buffer 13a in FIG. 2 may be removed.

Figure 3:
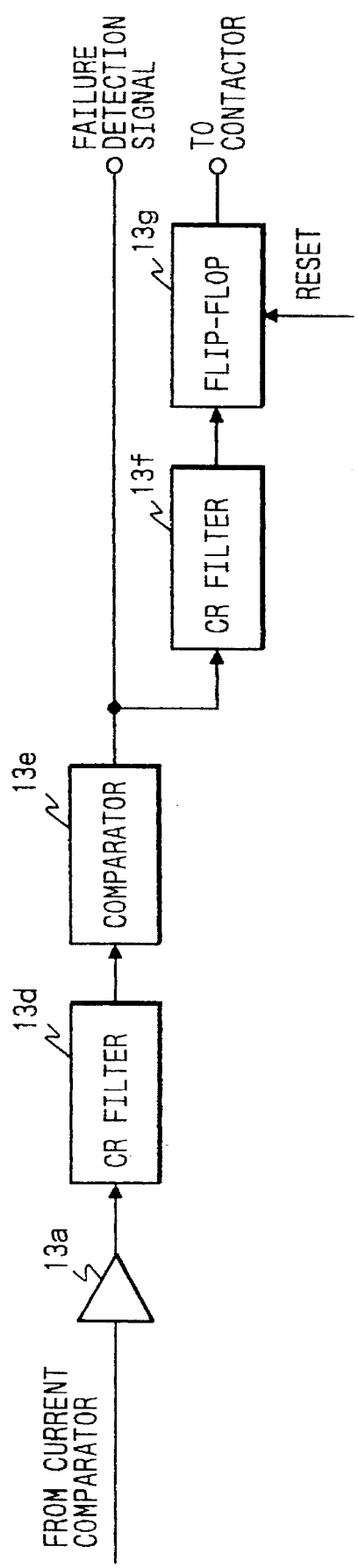
FIG. 3 is a block diagram showing another example of the main part of the computing circuit 13 in FIG. 1.

Further, the main part of the operation circuit 13 may be realized in such a structure as shown in FIG. 3. In FIG. 3, a CR filter 13d and a comparator 13e are added to the components included in FIG. 2. The CR filter 13d starts an integration operation in response to the "1" level signal from the buffer 13a.

The comparator 13e decides whether or not the output from the CR filter 13d is equal to or larger than a predetermined value. The CR filter 13d serves as the second delay means in which its delay time is set so that failure is not erroneously detected owing to noise.

In response to the "1" level signal from the buffer 13a, the CR filter 13d starts an integration operation. The comparator 13e decides whether or not the integration output is equal to or larger than a preset value. If yes, the comparator 13e produces a "1" level signal. The operation circuit 13 stops the invertor main circuit 2 on the basis of the "1" level signal from the comparator 13e.

The output from the comparator 13e is also fed to a CR filter 13f. The CR filter 13f and a flip-flop 13g, which correspond to the CR filter 13b and flip-flop 13c described above, perform the above operation on the basis of the "1" level signal from the comparator 13e. Incidentally, the CR filter 13f serves as the third delay means which starts an integration operation in response to the "1" level signal from the comparator 13e.

In accordance with the structure as shown in FIG. 3, false detection due to noise can be prevented, and after the invertor main circuit stops, the contact making can be opened to assure safety.

Where the battery 1 and the induction motor 3 are not to be separated from each other, the CR filter 13f and flip-flop 13g can be done without.

A gate circuit like a buffer may be used instead of the comparator 13e. In this case, the CR filter 13d sets the delay time for the value enough to prevent false detection for failure. The delay time is the time from when the CR filter 13d starts the integration operation in response to the "1" level signal to when the output from the CR filter 13d reaches the threshold value of the buffer. The comparator 13e can be done without.

The CR filter 13d serves to not only prevent false detection of failure due to the noise superposed on each signal line, but also that due to delaying a torque command signal. This will be explained.

Generally, the delay of an induction motor for the command signal from an invertor is minute. Therefore, if this is applied to an electric vehicle as it is, when a driver abruptly presses an accelerator, the induction motor immediately produces the torque corresponding to the opening of the accelerator, thus providing great shock to the vehicle.

In order to obviate such inconvenience, the output signal from the opening/torque converter memory 8 is slightly delayed by a delay circuit (not shown). The output from the opening/torque converter memory 8, therefore, is not the value corresponding to the an actual torque command value during the delay time. Thus, the comparator 12 may produce the failure detection signal during the delay time. The CR filter 13d in this embodiment sets the delay time capable of absorbing this failure detection signal to prevent false detection of failure.

The false failure detection due to delaying the above torque command signal can be obviated by not the CR filter 13d but provision of a delay circuit for delaying the output from the opening/current converter memory 11.

The above problem can be solved by removal of the delay circuit for delaying the torque command signal and provision of a delay circuit for delaying the signal from the accelerator opening sensor 7 to supply a delayed accelerator opening signal to the opening/current converter memory 11 and opening/current converter memory 11. In this case, the number of delay circuits to be provided can be reduced to simplify the controller apparatus.

Embodiment 2

The second embodiment of the present invention is an improvement of the first embodiment. The second embodiment intends to prevent an electric vehicle from running away when the accelerator opening sensor 7 has a trouble.

Now it is assumed in the first embodiment that the accelerator opening sensor 7, because its trouble, produced a signal of accelerator opening 50% larger than an actual opening of 40 %. Then, if the controller apparatus is normal, the induction motor 3 produces the torque corresponding to the accelerator opening of 50%. This means for a driver that the torque greater than that required by him is produced. In this case, the driver can obtain the torque required by himself by slightly adjusting an accelerator pedal.

But, if the vehicle is stopped in this state, the accelerator opening sensor 7 produces the signal corresponding to the accelerator opening 10% although the actual accelerator opening is 0%. Then, the induction motor 3 intend to drive the vehicle at the torque corresponding to the accelerator opening of 10%. On the other hand, since the accelerator pedal has been already released, unlike during the driving, it is impossible to decrease the accelerator opening thereby to reduce the output torque. In such a case, the vehicle will run away contrary to the intention of the driver.

In order to obviate such inconvenience, the second embodiment of the present invention has the following configuration.

Figure 4:
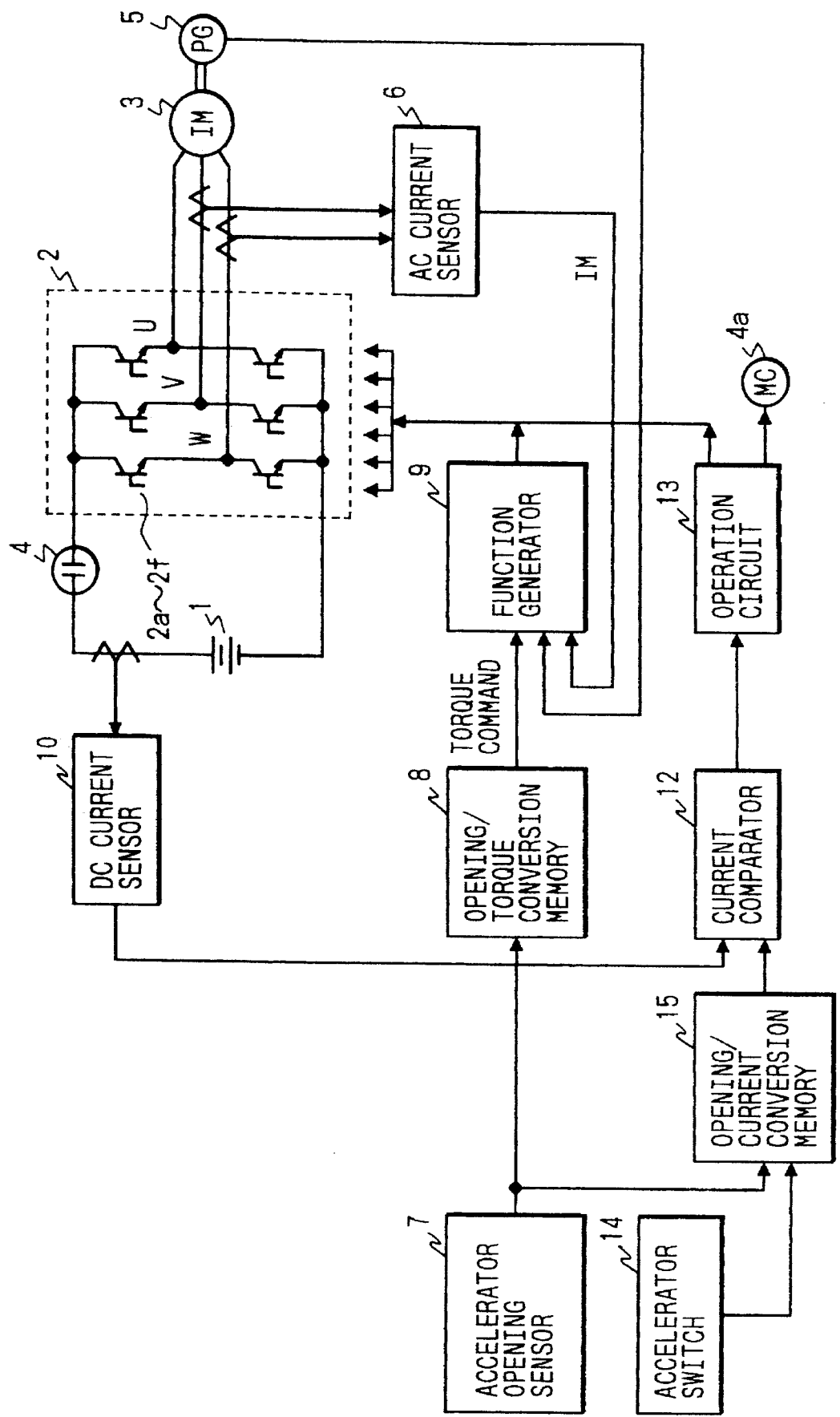
FIG. 4 is a block diagram of the controller apparatus for an electric vehicle according to the second embodiment of the present invention.

FIG. 4 shows the configuration of the second embodiment of this embodiment. This embodiment is different from the first embodiment in only an accelerator switch 14 and an opening/current converter memory 15. The accelerator switch 14 is means for detecting that the accelerator opening is in a completely closed or substantially completely closed state, and produces a level "1" signal when the closed state of the accelerator is detected. The opening/current converter memory 15 is means for computing a preset reference value corresponding to an accelerator opening in response to the outputs from the accelerator opening sensor 7 and accelerator switch 14. The opening/current converter memory 15 is composed of a memory circuit for reading a preset current corresponding to the detected output of an accelerator opening from the accelerator opening sensor 7 and a fixed value production circuit for producing a first predetermined value when the output from the accelerator switch 14 is an "1" level signal. The converter memory 15 produces as a reference value, either one of the outputs from the memory circuit and the fixed value production circuit. The opening/current converter memory 15 is so constructed that the fixed value production circuit has priority to the memory circuit. Namely, the accelerator switch 14 produces the "1" level signal, the converter memory 15 produces, as the reference value, the first predetermined value output from the fixed value production circuit. The first predetermined value is a fixed value which depends on the motor to be used. In this embodiment, the first predetermined value is set for a value which is larger by about ten percent than the excitation current value for the induction motor 3. Incidentally, the memory circuit in the opening/current converter memory 15 corresponds to that in the opening/current converter memory 11 described above. In the second embodiment, the opening/current converter memory 15, current comparator 12 and operation circuit constitute failure decision means.

The operation of the second embodiment will be explained.

When the accelerator pedal 14 is released to be in an open state, the accelerator switch 14 produces a "1" level signal. In response to the "1" level signal, the opening/current conversion memory 15 produces, from the fixed value output circuit, the first predetermined value which is larger by 10% than the excitation current of the induction motor 3. The current comparator 12 compares the first predetermined value with the detected output from the DC current sensor 10. If the vehicle is stopping in the open state of the accelerator pedal, only the current corresponding to the excitation current is supposed to flow through the induction motor 3. On the basis of this supposition, if the detected output from the DC current sensor 10 is larger than the first predetermined value, the current comparator 12 decides that the accelerator opening sensor is faulty.

Now it is supposed that although the accelerator pedal is opened so that the vehicle is stopping, the vehicle is driven because of failure of the accelerator opening sensor 7.

The above memory circuit receives the detected output from the accelerator opening sensor 7 to read the set current corresponding to the accelerator opening of 10%. On the other hand, the fixed value output circuit receives the "1" level signal from the accelerator switch 14 to produce the first predetermined value. Since the detected output from the accelerator switch 14 is the "1" level signal, the opening/current conversion memory 15 produces, as a reference value, the first predetermined value which is the output from the fixed value output circuit.

The current comparator 12 compares the above reference value with the detected output from the DC sensor 10. Then, if the controller is normal, the value corresponding to the detected output from accelerator sensor 7, i.e. the current enough to produce the torque of 10% is flowing through the induction motor 3. The DC current sensor 10, therefore, produces the signal required for the induction motor 3 to produce the torque of 10%. On the other hand, the first predetermined value is only slightly larger than the excitation current for the induction motor 3. Thus, since the detected output from the DC sensor 10 is larger than the first predetermined value, the DC current sensor 12 produces a "1" level signal. In response to the "1" level signal from the current comparator 12, the operation circuit 12 stops the operation of the invertor main circuit 2 to stop the drive of the induction motor 3.

Embodiment 3

Figure 5:
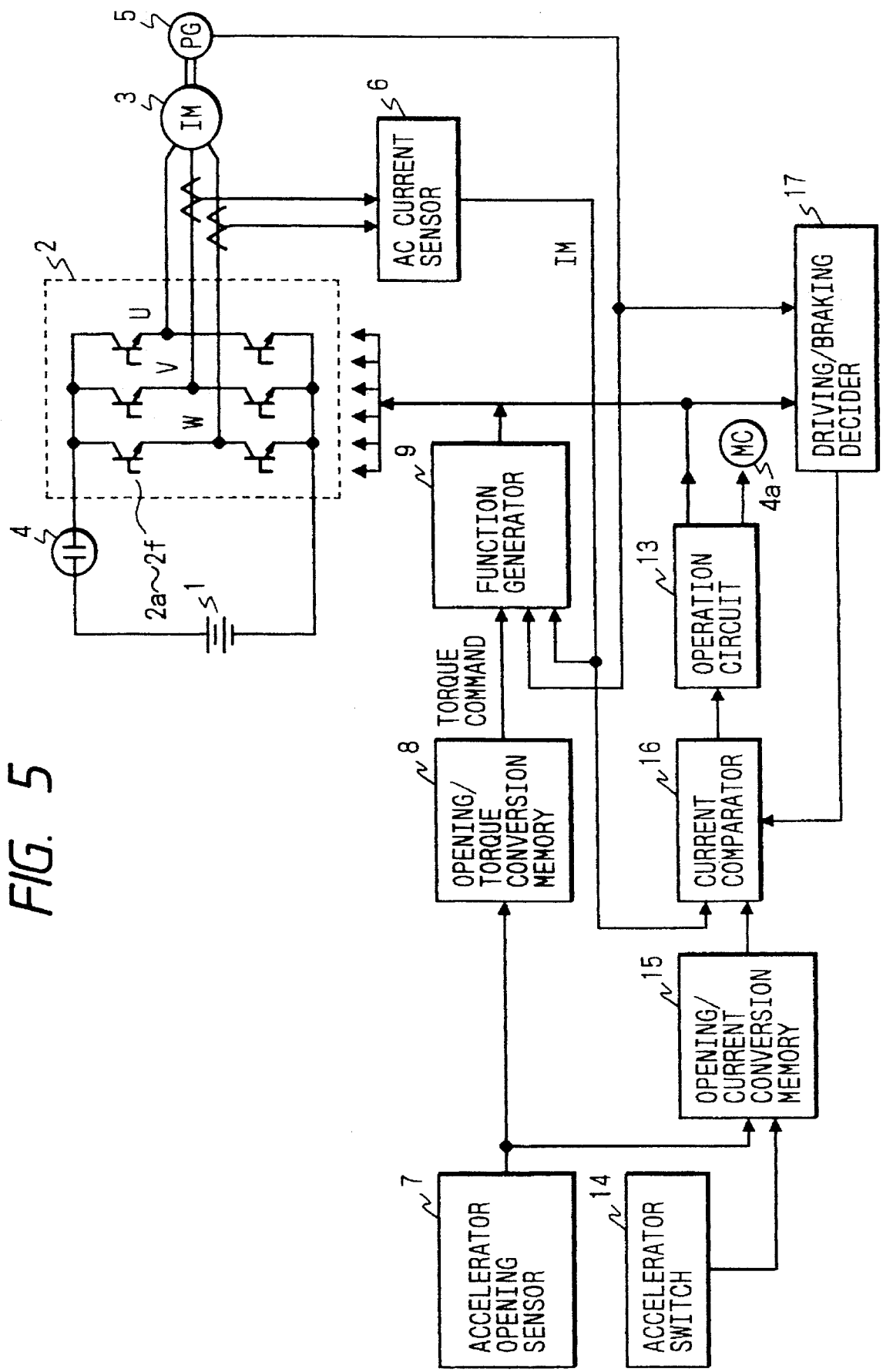
FIG. 5 is a block diagram of the controller apparatus for an electric vehicle according to the second embodiment of the present invention.

In the first and second embodiments, the current supplied to the induction motor 3 was detected or sensed by the DC current sensor. But it may be detected by an AC current sensor. FIG. 5 shows the arrangement of Embodiment 3. In FIG. 5, reference numeral 16 denotes a comparator which serves as a failure detecting means for detecting the detected output from the AC sensor 6 and the output from the opening/current conversion memory 15. The current comparator 16 produces a "1" level signal when the detected output from the AC sensor 6 is larger than the output from the opening/current conversion memory 15. Reference numeral 17 denotes a driving/braking decision means for deciding the driving/regenerative-braking from the polarity of the slippage of the induction motor 3 detected on the basis of the output from the function generator 9 and the detected output from the pulse generator 5. The driving/braking decision means 17 serves as a failure decision inhibiting means. The output from the driving/braking decision means 17 is supplied to the current comparator 16.

Figure 12:
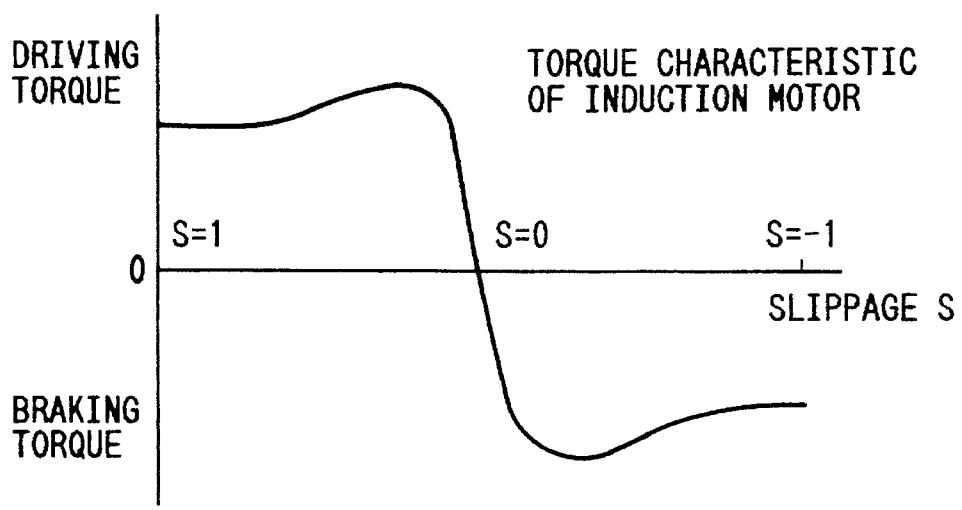
FIG. 12 is a characteristic graph showing the relation between torque and slip in an induction motor.

FIG. 12 shows a relationship between the torque and slippage in an induction motor. As seen from FIG. 12, the induction motor 3 is in a driving state when the polarity of the slippage is positive, and it is in a regenerative braking state when the polarity is negative.

In this embodiment, the failure decision means is composed of the opening/current conversion memory 15, current comparator 16 and operation circuit 13.

The operation in this embodiment is different from the previous embodiments in only methods of current detection and inhibition of failure decision. For failure detection, the current comparator 16 compares the detected output from the AC current sensor 6 and the output from the opening/current conversion memory 15. The driving/braking decision means 17 detects the running state of the induction motor 3. Then, if the induction motor 3 is in the regenerative braking state, it supplies a failure decision inhibiting signal to the current comparator 16. When the current comparator 16 receives the failure decision inhibition signal, it does not perform the comparison operation, or forcibly produces a "0" level signal.

Embodiment 4

This embodiment intends to simplify the failure decision means to improve its reliability.

Figure 6:
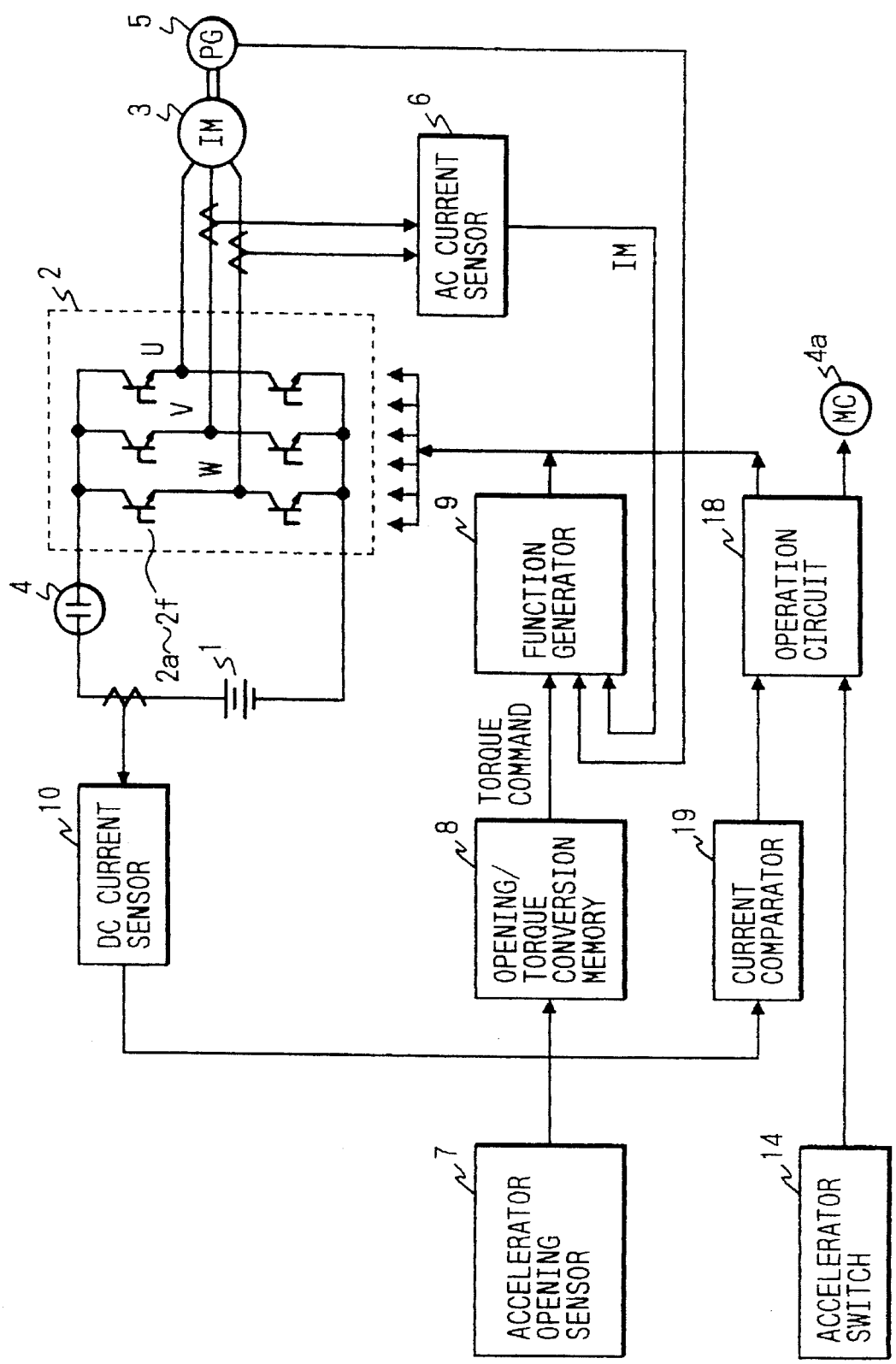
FIG. 6 is a block diagram of the controller apparatus for an electric vehicle according to the third embodiment of the present invention.

FIG. 6 shows an arrangement of this embodiment. In this embodiment, the opening/current conversion memory is omitted, and the detected output from the accelerator switch 14 is supplied to an operation circuit 18.

Figure 7:
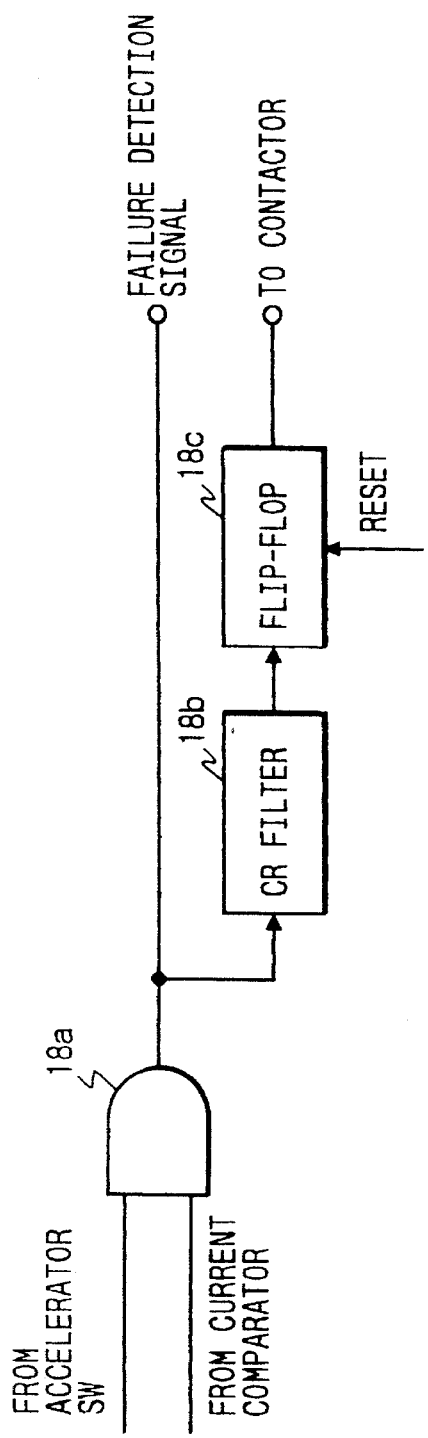
FIG. 7 is a block diagram of an example of the main part of the computing circuit 18 in FIG. 6.

FIG. 7 shows the main part of the operation circuit 18. In FIG. 7, reference numeral 18a denotes an AND circuit which receives the detected signal from the accelerator switch 14 and the output signal from the current comparator 19. When both outputs from the accelerator switch 14 and current comparator 19 are "1" level signals, the AND circuit 18a detects the failure to produce a "1" level signal, or failure detection signal. Reference numerals 18b and 18c denote a CR filter and a flip-flop which correspond to the CR filter 13b and flip-flop 13c in FIG. 2, respectively.

In FIG. 6, a current comparator 19 compares the detected output from the DC current sensor 10 with a second predetermined value which is a preset value. When the detected output from the DC current sensor 10 is larger than the second predetermined value, the current comparator 19 produces a "1" level signal. The second predetermined value is preset for a value which is larger by 10% than the excitation current for an induction motor to be used. The current comparator includes a failure decision inhibiting means. This failure decision inhibiting means is the same as the diode included in the current comparator 12.

In this embodiment, the failure decision means is composed of the current comparator 12 and the operation circuit 18. The failure detection means is composed of the current comparator 12 and the AND circuit 18a.

In this embodiment, the failure of the controller is decided when the accelerator is in a closed state and the current (driving current) supplied to the induction motor 3 is larger than the second predetermined value.

In this embodiment, therefore, when both outputs from the accelerator switch 14 and current comparator 19 are "1" level signals, failure is detected, and the operation of the invertor main circuit 2 is stopped on the basis of the failure detection signal.

The failure detection signal is also supplied to the first delay means of the CR filter 18b. After the operation of the invertor main circuit 2 is stopped, the operation circuit 18 opens the contact making 4 on the basis of the delayed failure detection signal.

If the opening of the contact making 4 is not required, the CR filter 18b and flip-flop 18c are omitted so that the reliability of the failure decision means can be further improved.

Embodiment 5

Figure 8:
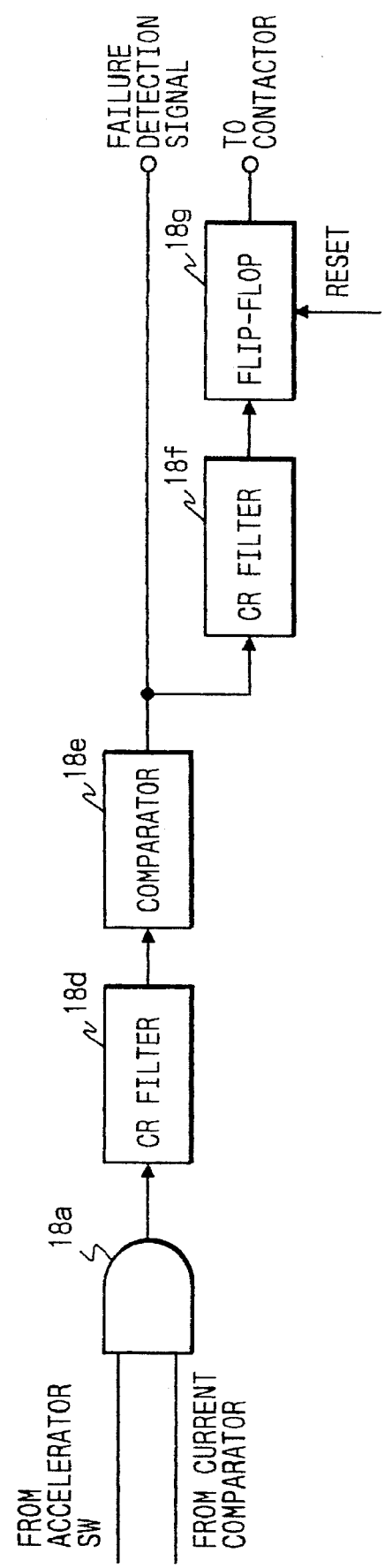
FIG. 8 is a block diagram of another example of the main part of the computing circuit 18 in FIG. 6.

The operation circuit 18 may be such an arrangement as shown in FIG. 8 in place of that shown in FIG. 7. The arrangement of FIG. 8 can provide the highly reliable controller for an electric vehicle which does not erroneously detect the failure owing to noise.

In FIG. 8, reference numeral 18d and 18e denote a CR filter and a comparator which correspond to the CR filter 13d and comparator 13d in FIG. 2, respectively. When the outputs from the accelerator switch 14 and the current comparator 19 are "1" level signals, the AND circuit 18a produces a failure detection signal at the "1" level.

In response to the failure detection signal, the CR filter 18f and the flip-flop 18g at the succeeding stages stop the drive of the induction motor 3 and opens the contact making 4. This operation is equivalent to that in Embodiment 4 and so not explained here. The CR filter 18f and comparator 18e correspond to the CR filter 18f and comparator 18e in FIG. 2, respectively. The CR filter 18f serves as the third delay means which starts an integration operation in response to the "1" level signal from the comparator 18e.

Embodiment 6

In the fourth and fifth embodiments, although the current is detected by the DC current sensor 10, it may be detected by an AC current sensor. In this case, as in the third embodiment, the driving/braking decision means 17 is provided as a failure decision inhibiting means so that in response to the signal from driving/braking decision means 17, the current comparator 19 does not perform a comparison operation during the regenerative braking of the induction motor 3, otherwise forcibly produces the "0" level signal.

In the above described embodiments, although CR filters are used as the first and third delay means, these delay means have only to delay the timing of the signal output by a predetermined time. The second delay means has only to prolong the input signal.

In the previous embodiments, the current (driving current) supplied to the induction motor 3 may be detected by a known current detection means such as shunt resistance in place of the DC current sensor.

In the previous embodiments, if the driving current when the accelerator is in a closed state is larger than the second predetermined value, failure is decided. In place of this, if the driving current when the accelerator opening is smaller than a predetermined value is larger than a predetermined current, the failure may be decided. In this case, the means of detecting the predetermined opening may be provided in place of the accelerator switch and the second predetermined value may be set for another predetermined value.

In the previous embodiments, although the memory for producing a torque command value corresponding to the accelerator opening was used, the means such as a function generator which only produces a torque command value corresponding to the accelerator opening may be used.

In the previous embodiments, although the opening/torque conversion memory 8 and function generator 9 were constructed by a microcomputer, they may be constructed by hardware. The opening/torque conversion memory 8 and function generator 9, and the failure decision means may be constructed by individual microcomputers.

In the previous embodiments, although the motor is controlled in a vector control system, it maybe controlled by another system such as a V/F constant control system.

Furthermore, in the previous embodiments, although the motor was an induction motor, it may be other motors such as a DC motor or synchronous motor.

According to the present invention, an electric vehicle does not abruptly run away since the output torque larger than that required by a driver is produced. Further, it is not erroneously decided that the controller suffers a failure even though it is actually normal when a motor is in an electric braking state. Furthermore, when failure of the controller is detected, the drive of a motor is provisionally stopped and thereafter a switch is opened so that the drive of the motor can be surely stopped. Furthermore, it is not erroneously decided that the controller suffers a failure owing to noise. Furthermore, the failure of the controller can be detected at any accelerator opening. Furthermore, the failure of the controller can be detected at any accelerator opening and the vehicle at rest does not abruptly run at full speed even when an accelerator sensor has failed. Furthermore, it is not erroneously decided that the controller suffers a failure owing to noise and also the drive of a motor can be surely stopped when the failure is detected. Furthermore, it is possible to provide a controller apparatus which is provided with highly reliable failure deciding means which is simple in structure.

Moreover, a controller apparatus for an electric vehicle according to the present invention does not erroneously decide that the controller suffers a failure owing to noise and also can surely stop the drive of a motor when the failure is detected.

What is claimed is:

1. A controller apparatus for an electric vehicle comprising:

a power supply;

a power converting section for converting a power from the power supply into a driving power;

a motor which receives an output from said power conversion section to drive the electric vehicle;

accelerator opening detecting means for detecting an accelerator opening;

a controller section for controlling said power converting section in response to a detected output from said accelerator opening detecting means;

current detecting means for detecting the current supplied to said motor from said power supply; and failure deciding means for deciding that the controller apparatus is faulty when the output from the current detecting means is not smaller than the reference value previously determined in accordance with the accelerator opening, thereby stopping the drive of said motor.

2. A controller apparatus for an electric vehicle as claimed in claim 1, further comprising failure decision inhibiting means for inhibiting failure decision when said motor is in an electrical braking state.

3. A controller apparatus for an electric vehicle as claimed in claim 1, further comprising: switching means arranged on a power supply path to said power converting section, wherein said failure decision means comprises:

failure detecting means for detecting that the controller apparatus is faulty when the output from the current detecting means is larger than the reference value previously determined in accordance with the accelerator opening, and first delay means for delaying the output from the failure detector means, and the drive of said motor is stopped on the basis of the output from said failure detecting means and said switching means is opened on the basis of the output from said first delay means.

4. A controller apparatus for an electric vehicle as claimed in claim 3, wherein a delay time by said first delay means is set for a time longer than the time from when said failure deciding means detect the failure to when said power conversion section is stopped.

5. A controller apparatus for an electric vehicle as claimed in claim 1, wherein said failure deciding means comprises:

failure detecting means for detecting that the controller is faulty when the output from the current detector means is larger than a predetermined reference value in accordance with the accelerator opening; and second delay means for delaying the output from the failure detecting means whereby the drive of said motor is stopped on the basis of the output from said second delay means.

6. A controller apparatus for an electric vehicle as claimed in claim 1, wherein said failure deciding means comprises:

reference value computing means for computing a predetermined reference value in accordance with the accelerator opening; and failure detecting means for detecting failure of the controller on the basis of the outputs from said current detecting means and reference value computing means, and said failure deciding means decides failure of said controller apparatus when the detected output from said current detection means is larger than the output from said reference value computing means to stop the drive of said motor.

7. A controller apparatus for an electric vehicle as claimed in claim 6, further comprising accelerator closed-state detecting means for detecting that an accelerator is in a closed state, wherein said reference value computing means outputs a first predetermined value when said accelerator closed-state detector means detects the closing state of the accelerator.

8. A controller apparatus for an electric vehicle according to claim 7, further comprising switching means arranged on a power supply path to a power conversion section, wherein said failure decision means comprises second delay means for delaying the output from the failure detecting means and third delay means for delaying the output from the second delay means, whereby the drive of said motor is stopped on the basis of the output from said second delay means and said switching means is opened on the basis of the output from said third delay means.

9. A controller apparatus for an electric vehicle according to claim 1, further comprising an accelerator closed-state detecting means for detecting the closing state of an accelerator, wherein said failure decision means comprises failure detecting means for comparing the output from said current detecting means with a predetermined reference value and detecting failure on the basis of the comparison result and the output from the accelerator closed-state detector means whereby when the accelerator is in a closed state and the detected output from said current detecting means is larger than said second predetermined value, failure of the controller apparatus is decided to stop the drive of said motor.

10. A controller apparatus for an electric vehicle according to claim 9, further comprising switching means arranged on a power supply path to a power conversion section, wherein said failure decision means comprises second delay means for delaying the output from the failure detecting means and third delay means for delaying the output from the second delay means, whereby the drive of said motor is stopped on the basis of the output from said second delay means and said switching means is opened on the basis of the output from said third delay means.

* * * * *